June 19, 1962 L. MORRIS, JR., ET AL 3,039,156
ADJUSTABLE WEATHER STRIPPING FOR DOOR FRAMES AND THE LIKE
Filed Jan. 11, 1960
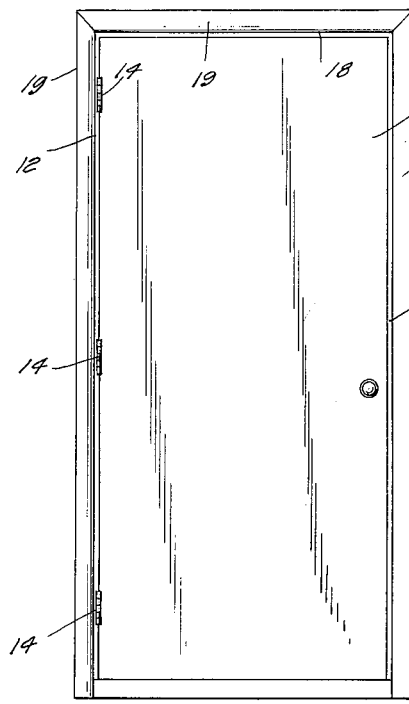
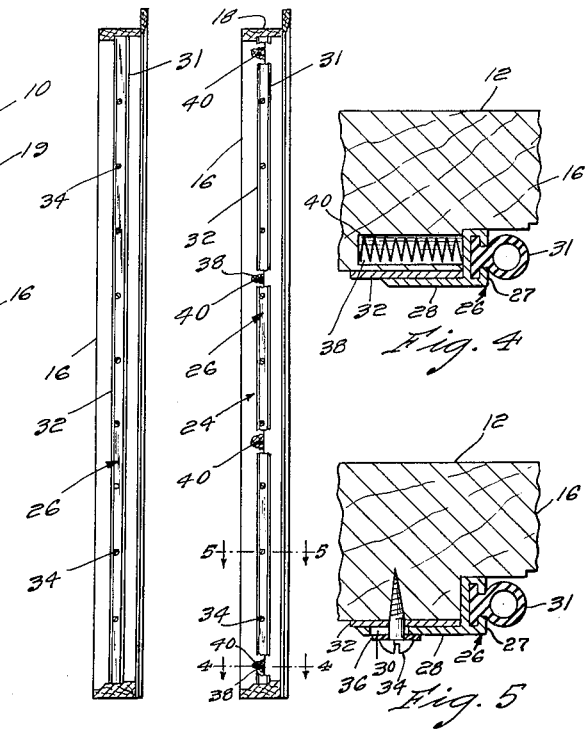
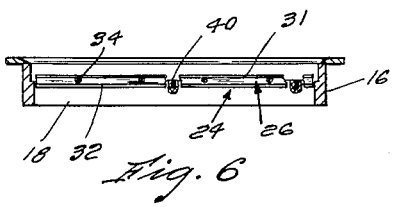
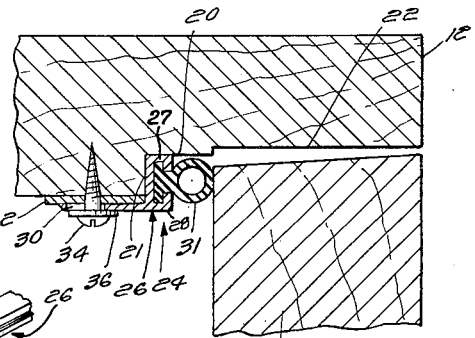
Inventors
Louis Morris, Jr.
John F. Penkala
Stanley F. Penkala
By Elliot A. Salter
Attorney

United States Patent Office 3,039,156
Patented June 19, 1962

3,039,156
ADJUSTABLE WEATHER STRIPPING FOR
DOOR FRAMES AND THE LIKE
Louis Morris, Jr., Rehoboth, Mass., John F. Penkala, Warren, R.I., and Stanley F. Penkala, Arlington, Mass., assignors to The Morris Corporation, Bristol, R.I., a corporation of Rhode Island
Filed Jan. 11, 1960, Ser. No. 1,729
1 Claim. (Cl. 20—68)

The present invention relates to an adjustable weather stripping for a closure. More particularly, the present invention relates to a sealing device for automatically compensating for warpage of a closure, such as a door, window or the like.

In closures such as doors or windows which are formed of wooden elements, the warping thereof due to changes in atmospheric conditions occur with sufficient frequency to cause the closure to improperly seat against the jamb thereof. This warping condition of the closure is particularly objectionable when the closure is exposed to the outside since the prior known weather sealing devices associated therewith do not prevent the outside air from entering through the opening in which the closure is positioned. Warping of the closure usually occurs because of low temperatures present on the exterior surfaces thereof, the interior surfaces of the closure usually being exposed to relatively higher temperatures. As the atmospheric conditions change, the difference in temperature causes the closure to warp. Prior to the instant invention, various types of weather sealing devices have been known and used, but primarily were of that type that required manual adjustments and further included some form of a sealing element that was fixed in position to either the door jamb or to the movable closure member. Usually in the prior known weather stripping or weather sealing devices, the operation thereof was dependent on the resilient characteristics of the weatherstripping material, and thus, in most instances, after the weather stripping material was applied to the door jamb or to the closure member, it was difficult to effect the closing of the closure member.

The present invention is designed to overcome the attendant difficulties experienced with the prior known weather sealing or weather stripping devices and includes a resiliently biased sealing member that is secured to a fixed jamb. The sealing member is designed to slide upon movement of the movable closure member into contact therewith and is deformable in a lengthwise direction thereof so that, upon warpage of the door, positive contact of the sealing member will be maintained along the entire length of the door edge. Since the weatherstripping device embodied in the present invention is attached to the fixed door jamb, the presently known door constructions may be easily modified to incorporate the subject device. Furthermore, the present invention includes relatively few parts and may be readily disassembled for repair or replacement of the several elements incorporated in the device.

Accordingly, it is an object of the present invention to provide a weather stripping or sealing device for a closure member that is adapted to compensate for the warpage thereof.

Another object of the present invention is to provide a sealing device for a movable closure member which includes a relatively movable sealing element that is adapted to maintain constant engagement with the edge of the closure member when it is located in the closed position thereof.

Still another object of the present invention is to provide a weatherstripping device that is secured to the fixed jamb of a window or door construction.

Still another object is to provide a sealing device for a window or door construction that includes resilient members for positively urging a sealing element into sealing contact with the edge of the window or door.

Other objects, features and advantages of the invention will become apparent as the description thereof proceeds when considered in connection with the accompanying illustrative drawings.

In the drawings which illustrate the best mode presently contemplated by us for carrying out our invention:

FIG. 1 is a front elevational view of a door as representing one form of a closure member, with which frame the sealing device embodied in the present invention is adapted to be employed;

FIG. 2 is a view in elevation of the weatherstripping or sealing device embodied in the present invention illustrating the manner the device is attached to a door jamb;

FIG. 3 is a view similar to FIG. 2, sections of the channel section and sealing member embodied in the subject invention being broken away to show the positions of internally mounted spring members;

FIG. 4 is a sectional view taken along line 4—4 in FIG. 3;

FIG. 5 is a sectional view taken along line 5—5 in FIG. 3;

FIG. 6 is a view similar to FIG. 3 but showing the top or uppermost end of the door jamb that is located above the door and further showing sections of the channel section being broken away to expose the spring members located therebehind;

FIG. 7 is a view similar to FIG. 5 and further showing the position of the closure member or door as it contacts the sealing member;

FIG. 8 is a perspective view of the channel member embodied herein;

FIG. 9 is a perspective view of the slide strip that is adapted to engage a face of the door jamb and the channel member; and FIG. 10 is a perspective view of the sealing member that is positioned within the channel member illustrated in FIG. 8.

In the practical application of the invention, the device embodied herein may be applied to any closure member, but for purposes of this description, is illustrated as being applied to a door.

Referring now to the drawings and particularly to FIG. 1, a door is indicated at 10 and as shown is hinged to a rear jamb 12 by hinge members 14 and is adapted to be moved into sealing engagement with a front jamb 16 and a top jamb 18. Molding or trim 19 surrounds the door opening and is fixed to the jambs 12, 16 and 18 to effect a finished appearance as is customary in the art. As illustrated more clearly in FIG. 7, the jamb 16 which is adapted to have the sealing device in the present invention incorporated therein is formed with a cut-out or rabbeted portion of the conventional construction and includes perpendicular faces 20 and 21. A notch 22 is also formed in the face 20 of the rabbeted portion and is utilized herein to provide a clearance space for a movable jamb such as is illustrated in Patent No. 2,859,-491. Thus, the movable jamb illustrated in the aforesaid patent may be moved inwardly without affecting the operation of the weather stripping device embodied in the subject invention. Positioned in the rabbeted section formed in the jamb 16 is the weather stripping or sealing device embodied herein, the sealing device being generally indicated in FIG. 7 at 24. The weather stripping or sealing device 24 includes a channel member 26 which as illustrated in FIG. 8 is formed in a forwardly extending C section 27 and a rearwardly projecting flange or extension 28 integrally joined to the C section. Formed in the flange or extension 28 are spaced slots 30, the purpose of which will hereinafter be described. As seen in FIG. 7, the rear face of the channel member 26 is adapted to be secured to the face 21 of the jamb rabbeted portion, the open side of the C section 27 facing the door opening. Positioned within the channel member 26 is a sealing element 31, the outer portion of which is generally tubular and the inner portion of which is formed in a generally T configuration that is adapted to be inserted within the C section of the channel member 26. The sealing element 31 is preferably formed of a plastic material but may be formed of any suitable material, such as rubber, without departing from the spirit of the invention. As shown in FIG. 7, the generally tubular outer portion of the sealing member 31 is adapted to contact the edge of the door or closure member 10 in the closed position thereof.

Prior to the fixing of the channel member 26 to the fixed jamb 16, an elongated metal strip 32 is inserted between the underside of the extension 28 and the jamb face. The channel member 24 is then secured to the fixed jamb 16 by screws 34 that extend through the slots 30 and through openings formed in the interiorly positioned strip member 32. As shown in FIG. 9, the strip member 32 is of sufficient length to extend the length of the jamb 16 and provides a surface upon which the channel member 26 may easily slide. It is seen that because of the formation of the slots 30 the movement of the channel member 26 is limited, the limit of movement being defined by the length of the slots 30. Plastic-type washers 36 are further provided through which the screws 34 extend and not only prevent scarring of the extension 28, but cooperate with the strip 32 to reduce the friction of the sliding channel member 26. Although the strip 32 is illustrated in flat form, the surface thereof may be undulated or corrugated, thereby reducing the surface area with which the extension 28 engages and accordingly reducing frictional drag during the sliding movement of the channel member 26.

In the operation of the device, it is necessary that the sealing element 31 that is positioned in the channel member 26 be sufficiently exposed for contact by the door 10 therewith, and for this purpose, interiorly mounted spring members are provided. Referring now to FIGS. 3 and 4, the structure and operation of the spring members is illustrated. In order to accommodate the interiorly mounted spring members, a plurality of spaced bores or openings 38 are formed in the face 21 of the jamb rabbeted portion. Positioned in each of the bores 38 and extending outwardly therefrom is a spring member 40 which, as shown in FIG. 4, may be a coil spring or the like. Since the spring members 40 extend outwardly of the bores 38, they contact the rear surface of the channel member 26 and tend to urge the channel member 26 in a direction toward the door opening. Thus, in the open position of the door, the spring members 40 urge the channel member 26 to the outermost position thereof, or to the right as seen in FIGS. 4, 5 and 7, this position being defined by the left-hand edge of the slot 30. Upon closing of the door 10, the edge thereof strikes the tubular portion of the sealing element 31. The tubular portion of the sealing element 31 is sufficiently flexible to provide a seal but is also sufficiently rigid to cause the channel member 26 to be shifted laterally to the left, as seen in FIGS. 4, 5 and 7, in response to the closing movement of the door 10, the limit of movement being determined by contact of the channel member with the face 21 of the jamb rabbeted portion. In this position, the sealing element 31 engages the edge of the door 10 and is slightly deformed by the pressure thereof to define a seal therewith. If it so happens that atmospheric or temperature conditions have caused the door 10 to be warped, the proximity of the edge of the door along the length thereof will be varied with respect to the jamb 16. In order to compensate for the warpage of the door 10, the channel member 26 is urged outwardly by the spring members 40 so that the sealing element 31 contacts the edge of the door 10. The channel member 26 and the sealing element 31 are sufficiently flexible so that they conform to the position of the door, whether it be straight or warped. Thus, the channel member 26 and the sealing element 31 will be deformed in the lengthwise direction thereof by the action of the spring members 40 to conform to the position of the door.

It is seen that the sliding movement of the channel member 26 together with the sealing element 31 associated therewith insures a seal at all times, regardless of the condition of the door 10. It is furthermore seen that the weatherstripping or sealing device embodied herein is automatic in the manner in which it conforms to the position of the door to provide a solid bearing surface at all points along the lengthwise edge of the door and jamb. The channel member 26 that retains the flexible sealing element 31 in position is formed in a one-piece construction, and thus the entire structural unit is simple to install or replace as desired. Since the sealing element 31 is always urged outwardly in the open position of the door, it will absorb the shock of a slammed door and in effect acts as shock absorber. In effect, the weather stripping device of the subject invention defines a floating seal that is continuously urged into sealing position.

By locating the unit in the jamb rabbeted portion, reduction of the entrance area of the doorway is avoided. Thus, in the construction of the door, the door knob may be closer to the jamb if desired, and because of the manner in which the sealing device 24 is secured to the jamb, free movement of the door handle therebeyond is assured. Since the sealing device 24 is slidable in movement, the door 10 does not compress the tubular portion 31 of the sealing member 24 as is usually the case in the heretofore known devices, fatigue of the sealing element 31 thereby being prevented.

The top jamb 18 is also provided with a similar sealing construction as indicated in FIG. 6 and cooperates with the sealing device on the jamb 16 and a suitable threshold to completely seal the door within the door opening. The butt jamb 12 may also be provided with a sealing device, but the springs 40 are eliminated and the unit is fixed in position upon the installation thereof. Manual adjustments may be made as required.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

In a door sealing construction, a fixed jamb having a cutout portion formed therein and extending the length thereof, a plurality of spaced openings formed in said cutout portion, a spring positioned in each of said openings and extending outwardly therefrom, an automatically adjustable elongated channel member secured to said fixed jamb along said cutout portion and engaging said springs for biasing outward movement thereby, said channel member including a C-shaped forward section and a rearwardly projecting flange that extends in parallel relation with respect to the inner face of said fixed jamb, a metallic insert strip positioned between the inner face of said jamb and the inner face of said flange, a plurality of spaced slots formed in said flange for receiving retaining screws therein that slidably secure said channel member to said fixed jamb, said slots defining the limit of outward movement of said channel section, and a flexible sealing element being formed with a T-shaped section that is positioned in said C-shaped channel member and an outwardly extending tubular portion that is adapted to be engaged by said door, said sealing element sealingly engaging said door in the closed position thereof and automatically adjusting to the position of said door by movement of said channel member in response to various closed positions of the door.

References Cited in the file of this patent

UNITED STATES PATENTS

| | | |
|---|---|---|
| 1,973,210 | Hufnail et al. | Sept. 11, 1934 |
| 2,494,247 | Kinish | Jan. 10, 1950 |
| 2,769,215 | Neff | Nov. 6, 1956 |

FOREIGN PATENTS

| | | |
|---|---|---|
| 251,396 | Great Britain | May 6, 1926 |
| 793,836 | France | Nov. 23, 1935 |
| 785,898 | Great Britain | Nov. 6, 1957 |